United States Patent
Holmes et al.

(10) Patent No.: US 8,790,201 B2
(45) Date of Patent: Jul. 29, 2014

(54) HYBRID TRANSMISSION WITH THREE PLANETARY GEAR SETS AND THREE INTERCONNECTING MEMBERS AND WITH SYNCHRONOUS SHIFT BETWEEN SERIES AND COMPOUND-SPLIT OPERATING MODES

(75) Inventors: Alan G. Holmes, Clarkston, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 720 days.

(21) Appl. No.: 12/966,383

(22) Filed: Dec. 13, 2010

(65) Prior Publication Data

US 2012/0149515 A1 Jun. 14, 2012

(51) Int. Cl.
*F16H 3/72* (2006.01)

(52) U.S. Cl.
USPC ............................................................ 475/5

(58) Field of Classification Search
None
See application file for complete search history.

(56) References Cited

U.S. PATENT DOCUMENTS 6,527,658 B2 3/2003 Holmes et al.
7,128,675 B2 10/2006 Klemen et al.
8,414,437 B2 * 4/2013 Bucknor et al. ............... 475/5
2008/0236921 A1 * 10/2008 Huseman ...................... 180/165
2009/0082171 A1 3/2009 Conlon et al.

OTHER PUBLICATIONS

Co-pending U.S. Appl. No. 12/720,721, Hybrid Transmission with Synchronous Shift Between Series and Compound-Split Operating Modes, filed Mar. 10, 2010.

* cited by examiner

*Primary Examiner* — Erin D Bishop
(74) *Attorney, Agent, or Firm* — Quinn Law Group, PLLC

(57) ABSTRACT

A hybrid transmission is provided that has both a hybrid series operating mode and a compound-split operating mode. The transmission includes an input member operatively connected with the engine, an output member, and a plurality of selectively engageable torque-transmitting mechanisms. A gearing arrangement and first and second motor/generators operatively connected with the gearing arrangement are also provided. The gearing arrangement includes a first, a second, and a third planetary gear set, each having a first, a second, and a third member. A pair of interconnecting members connect two respective ones of the members of one of the planetary gear sets for common rotation with two respective ones of the members of another of the planetary gear sets. Another interconnecting member connects a third of the members of the one of the planetary gear sets for common rotation with one of the members of still another of the planetary gear sets.

18 Claims, 6 Drawing Sheets

US 8,790,201 B2

HYBRID TRANSMISSION WITH THREE PLANETARY GEAR SETS AND THREE INTERCONNECTING MEMBERS AND WITH SYNCHRONOUS SHIFT BETWEEN SERIES AND COMPOUND-SPLIT OPERATING MODES

TECHNICAL FIELD

The invention relates to a hybrid transmission having both a series and a compound-split operating mode.

BACKGROUND OF THE INVENTION

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the additional components required for a hybrid powertrain, such as the motor/generators, brakes and/or clutches, may increase overall vehicle cost and packaging space requirements.

SUMMARY OF THE INVENTION

A hybrid transmission is provided that has both a hybrid series operating mode and a compound-split operating mode. The transmission includes an input member operatively connected with the engine, an output member, and a plurality of selectively engageable torque-transmitting mechanisms. A gearing arrangement and first and second motor/generators operatively connected with the gearing arrangement are also provided. The gearing arrangement includes a first, a second, and a third planetary gear set, each having a first, a second, and a third member. A pair of interconnecting members connect two respective ones of the members of one of the planetary gear sets for common rotation with two respective ones of the members of another of the planetary gear sets. Another interconnecting member connects another of the members of the one of the planetary gear sets for common rotation with one of the members of still another of the planetary gear sets. None of the interconnecting members connect members of all three of the planetary gear sets for common rotation. A first motor/generator is operatively connected with the first planetary gear set. A second motor/generator is operatively connected with the second planetary gear set. A first of the torque-transmitting mechanisms is engaged to establish a hybrid series operating mode between the input member and the output member. A second of the torque-transmitting mechanisms is engaged to establish a compound-split operating mode between the input member and the output member.

Due to the above-mentioned torque-transmitting mechanisms and interconnecting members, the shift between the hybrid series operating mode and the compound-split operating mode may be synchronous without slipping the torque-transmitting mechanisms and may occur while the engine is on. As used herein, "synchronous" means without substantial slip of any of the engaged torque-transmitting mechanisms, so that disengagement of one or more torque-transmitting mechanisms and engagement of one or more other torque-transmitting mechanisms can be commanded by the controller at essentially the same time. Feedback of the state of engagement or disengagement of the clutches during the shift is not essential, as in a controlled slip situation, thus simplifying the clutch control algorithm and hydraulic feed system.

The compound-split operating mode may be used during high vehicle speeds to minimize the electrical losses associated with the series operation, especially with the motors at high speed. Because the compound-split mode utilizes the planetary gear sets, the motors may operate at a relatively low speed. By enabling a synchronous shift and avoiding slip, either mode can be easily selected and losses are minimized. The shift takes place at a transmission torque ratio corresponding to a fixed gear point, where it is possible for essentially all of the power from the input member to the output member to be transmitted mechanically if both clutches remain in the applied state and motor/generator power is removed, with no substantial power transmitted electrically.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
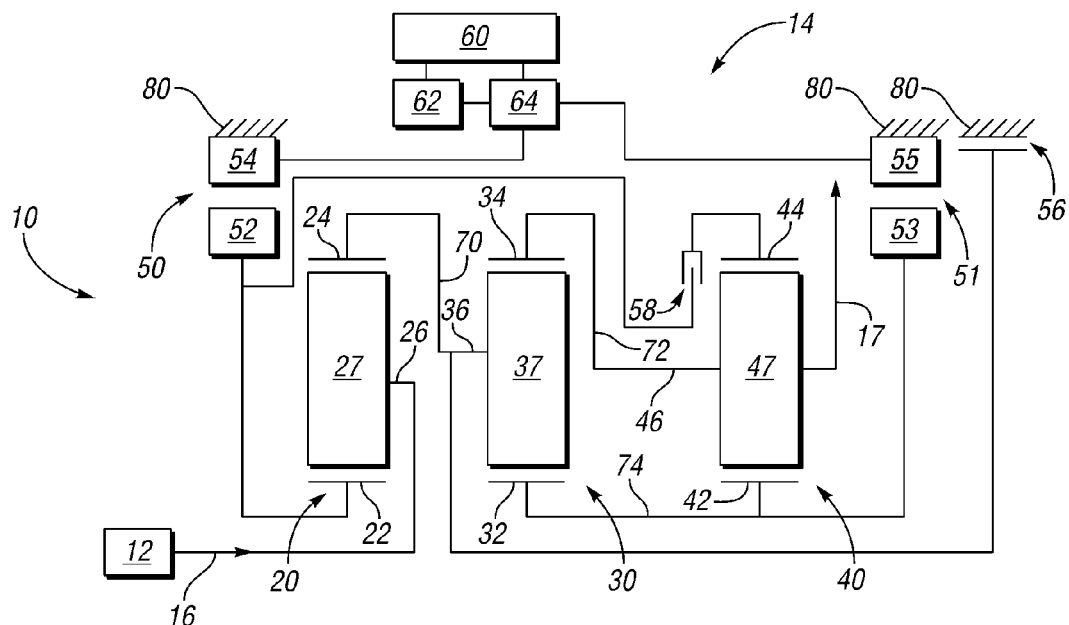
FIG. 1 is a schematic stick diagram illustration of a first embodiment of a hybrid powertrain.

Referring to the drawings, FIG. 1 shows a hybrid powertrain 10 that includes an engine 12 operatively connected to a hybrid transmission 14. An engine output member, such as a crankshaft, is operatively connected for rotation with an input member 16 of the transmission 14. As used herein, an "engine" includes any power source connected for providing torque at the input member 16 that is not powered by the electrical power stored in battery 60. For example, an engine includes an internal combustion engine, a diesel engine, a rotary engine, etc. The powertrain 10 is operable to provide tractive torque at an output member 17 of the transmission 14 in both a series hybrid operating mode and a compound-split hybrid operating mode, as discussed below.

The transmission 14 has three planetary gear sets 20, 30 and 40, each of which is a simple planetary gear set. Planetary gear set 20 has a sun gear member 22, a ring gear member 24 and a carrier member 26. Pinion gears 27 rotatably supported on carrier member 26 mesh with both the ring gear member 24 and the sun gear member 22. Planetary gear set 30 has a sun gear member 32, a ring gear member 34 and a carrier member 36. Pinion gears 37 rotatably supported on carrier member 36 mesh with both the ring gear member 34 and the sun gear member 32. Planetary gear set 40 has a sun gear member 42, a ring gear member 44 and a carrier member 46. Pinion gears 47 rotatably supported on carrier member 46 mesh with both the ring gear member 44 and the sun gear member 42. The input member 16 is continuously connected for common rotation with the carrier member 26. The output member 17 is continuously connected for common rotation with the carrier member 46.

The transmission includes a first motor/generator 50 and a second motor/generator 51. Motor/generator 50 has a rotor 52 connected for common rotation with sun gear member 22 and a stator 54 grounded to a stationary member 80 such as a transmission casing. Second motor/generator 51 has a rotor 53 and a stator 55. Stator 55 is grounded to the stationary member 80. An energy storage device, such as a battery 60, is operatively connected by transfer conductors to the stators 54, 55. A controller 62 controls electrical transfer between the battery 60 and the stators 54, 55 through a power inverter module 64 that changes direct current provided by the battery 60 to alternating current required for operation of the motor/generators 50, 51 (and vice versa when the motor/generators 50, 51 are operable as generators). The inverter module 64 may house two separate inverters, one for each motor/generator 50, 51.

Ring gear member 24 and carrier member 36 are continuously connected for common rotation with one another by a first interconnecting member 70. Ring gear member 34 is continuously connected for common rotation with carrier member 46 by a second interconnecting member 72. Sun gear members 32, 42 are connected for common rotation by a third interconnecting member 74. A rotor hub of rotor 53 is also connected for common rotation with interconnecting member 74 so that sun gear members 32 and 42 rotate at the same speed as the rotor 53. None of the interconnecting members 70, 72, 74 connect to members of all three of the planetary gear sets 20, 30, 40; that is, the interconnecting members 70, 72, 74 each interconnect only two members of two different planetary gear sets. Furthermore, interconnecting members 72 and 74 are a pair of interconnecting members each of which interconnects a respective member of the planetary gear set 30 to a respective member of the planetary gear set 40 so that two different members of the planetary gear set 30 are connected for common rotation with two different members of the planetary gear set 40. As used herein, planetary gear set 20 is a first planetary gear set, planetary gear set 30 is a second planetary gear set, and planetary gear set 40 is a third planetary gear set. Carrier member 26 is a first member, sun gear member 22 is a second member, and ring gear member 24 is a third member of the planetary gear set 20. Carrier member 36 is a first member, ring gear member 34 is a second member, and sun gear member 32 is a third member of planetary gear set 30. Carrier member 46 is a first member, sun gear member 42 is a second member, and ring gear member 44 is a third member of planetary gear set 40.

The transmission 14 includes only two torque transmitting mechanisms. A brake 56 is selectively engageable to ground the carrier member 36 and ring gear member 24 to the stationary member 80 by grounding the interconnecting member 70. Clutch 58 is selectively engageable to connect the sun gear member 22 and motor/generator 50 for common rotation with the ring gear member 44. By controlling the motor/generators 50, 51, the clutch 58 and the brake 56, multiple different operating modes are available for forward propulsion. The motor/generators 50, 51 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 50 to function as a generator, and controlling motor/generator 51 to function as a motor. With brake 56 engaged, carrier member 36 and ring gear member 24 are stationary. Torque from the engine 12 is supplied to the rotor 52 at a gear ratio established by the planetary gear set 20. The torque is converted to electrical energy stored in the battery 60 or transmitted directly to the motor/generator 51 via inverter 64 to power motor/generator 51 to function as a motor, providing torque at the sun gear member 32. The torque is multiplied through the planetary gear set 30 and provided at the output member 17. Because ring gear member 44 is not connected to any other member or to the stationary member 80, planetary gear set 40 is inactive in the series operating mode.

A series operating mode requires two groups of gear members arranged so that the rotational speeds of the second group are determined by electrical power provided to a motor/generator connected to a member of the second group. The first group connects the engine 12 with the first motor/generator 50, and the second group connects the second motor/generator 51 with the output member 17. A series operating mode is beneficial because there is no purely mechanical power flow path between the engine 12 and the output member 17. Thus, spin losses and the disruption in output torque to restart the engine 12 using the motor/generators 50, 51 are lower. In the series operating mode, the first group of gear members includes those gear members providing a power flow path from the engine 12 to the motor/generator 51 (i.e., carrier member 26, sun gear member 22, and interconnected ring gear member 24 and carrier member 36). The second group of gear members includes those gear members providing a power flow path from the second motor/generator 51 to the output member 17 (i.e., interconnected sun gear members 32, 42, carrier member 36, and carrier member 46). Furthermore, in order to keep motor size relatively small, the motor/generator 51 that drives the output member 17 in the series mode should have a geared ratio to the output member 17. This requires a grounded member, in this case carrier member 36.

A compound-split operating mode is provided when clutch 58 is engaged and brake 56 is not engaged (i.e., disengaging it if previously engaged). A compound-split operating mode is beneficial for efficient operation during high-speed driving, as it allows for reduced motor speeds and decreased power through the electrical power path. That is, all of the mechanical power is not converted to electrical power, then converted again to mechanical power through the motor/generators 50, 51 as is the case in the series operating mode.

A compound-split operating mode requires four planetary gear members that are not connected for common rotation with one another but that are connected with one another through differential gearing (i.e., one member (carrier member 26) connected for rotation with the input member 16, a member (sun gear member 22) connected for rotation with the motor/generator 50, a member (interconnected sun gear members 32, 42) connected for rotation with the motor/generator 51, and a member (interconnected carrier member 46 and ring gear member 34) connected for rotation with the output member 17). A fifth member (the ring gear member 44), is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 22 and ring gear member 44 are interconnected to function as a single member, and interconnected ring gear member 24 and carrier member 36 are available to be grounded during a shift to the series operating mode, while still allowing the other four members to be moving, as is required for the series operating mode, thus satisfying the requirement of the compound-split operating mode that there are four members interconnected by differential gearing.

In the compound-split operating mode, the engine 12 provides torque at the carrier member 26 and the motor/generator 50 provides torque to or receives torque from the sun gear member 22 and ring gear member 44. The torque from the engine 12 and the motor/generator 50 is combined through the planetary gear set 20 to flow to the ring gear member 44. Torque is provided from or to the motor/generator 51 at the interconnected sun gear members 32, 42. Torque provided at ring gear member 44 and torque received from or provided to the motor/generator 51 at the sun gear member 42 is split through planetary gear set 40 to provide torque at the carrier member 46 and output member 17. Thus, the torque is split at planetary gear set 20 (input-split) and split again at planetary gear set 40 (output-split), making the operating mode a compound-split operating mode.

A switch from the series operating mode to the compound-split operating mode can occur with a synchronous shift of clutch 58 and brake 56 by controlling the motor/generator 50 to bring the speed of sun gear member 22 to the same speed as ring gear member 44. The gear members that are controlled to be at the same speed (ring gear member 44 and sun gear member 22) must be different than the four gear members required for series operation, as all of those gear members must be rotating in the series operating mode. Clutch 58 can then be engaged while brake 56 is released. There is no need to slip clutch 58 as there is no speed differential between the sun gear member 22 and the ring gear member 44. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratios of planetary gear sets 20 and 40 are 1.5 and the ring gear member to sun gear member ratio of planetary gear set 30 is 3.0, then if both clutch 58 and brake 56 are engaged, a fixed gear ratio of 1.47 will result between the input member 16 and the output member 17 when motor/generators 50 and 51 are not transmitting power.

An electric-only operating mode is established if the engine 12 is stopped, brake 56 is engaged, and motor/generator 51 is operated as a motor for forward propulsion.

When brake 56 is engaged, if the engine 12 is stopped, the motor/generator 50 can be controlled to operate as a motor to start the engine 12. Because clutch 58 is not engaged and motor/generator 51 is off, planetary gear sets 30 and 40 are inactive (do not carry torque) and torque is not transferred to the output member 17 while the engine 12 is being started.

During both the series operating mode and the compound-split operating mode, the motor/generator 51 can be controlled to operate as a generator to convert some of the torque at the output member 17 to electrical energy during vehicle braking.

Figure 2:
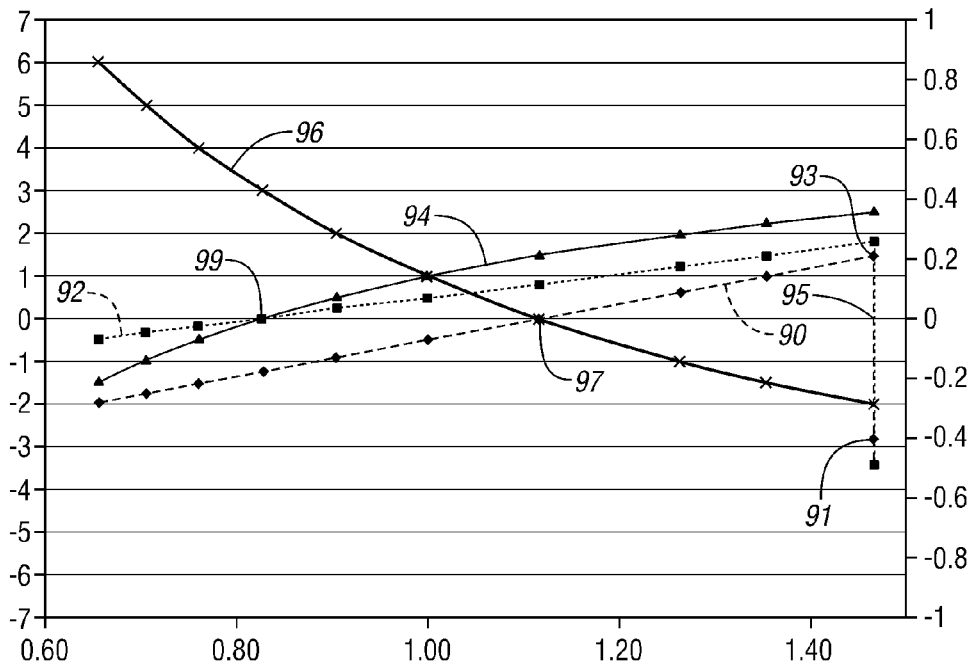
FIG. 2 is a chart showing the ratio of motor speed and torque to transmission input speed and torque respectively, versus transmission torque ratio for the powertrain of FIG. 1.

Referring to FIG. 2, the compound-split operating mode is illustrated with the relationship between the ratio of the torque of motor/generator 50 to the torque of the input member 16 versus the ratio of torque of the output member 17 to torque of the input member 16 illustrated as curve 90. The relationship between the ratio of the torque of motor/generator 51 to the torque of the input member 16 versus the ratio of torque of the output member 17 to torque of the input member 16 is illustrated as curve 92. The relationship between the ratio of the speed of motor/generator 50 to the speed of the input member 16 versus the ratio of torque of the output member 17 to torque of the input member 16 is illustrated as curve 94. The relationship between the ratio of the speed of motor/generator 51 to the speed of the input member 16 versus the ratio of torque of the output member 17 to torque of the input member 16 is illustrated as curve 96.

FIG. 2 represents a compound-split operating mode of powertrain 10 assuming no battery power is used, and thus motor/generators 50 and 51 are power-balanced (i.e., the product of the speed and torque of motor/generator 50 is equal to the product of the speed and torque of motor/generator 50). At point 91, in series mode with brake 56 engaged, clutch 58 can be engaged. The transition from series mode to compound-split mode occurs at constant transmission torque ratio 1.40 (point 91 to 93), with motor/generator 50 gradually reversing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission can ratio up or down. In the maneuver represented by FIG. 2, the transmission 14 starts ratioing downward in torque ratio (i.e., to the left in FIG. 2) in compound-split mode after the constant-ratio transition from series operating mode to compound-split operating mode. Alternatively, the motor/generator 50 torque could be reduced to zero by moving down to point 95 in FIG. 2. At this point, the transmission 14 is in fixed gear mode with 100% mechanical power transfer and no electrical loss. Note that in compound-split mode, there are two other points 97 and 99 where there is also 100% mechanical power transfer because one of the motor/generators 50 or 51 is stationary. However, at these points the motor torque is non-zero at the stationary motor, which consumes electrical power from the battery 60.

Figure 3:
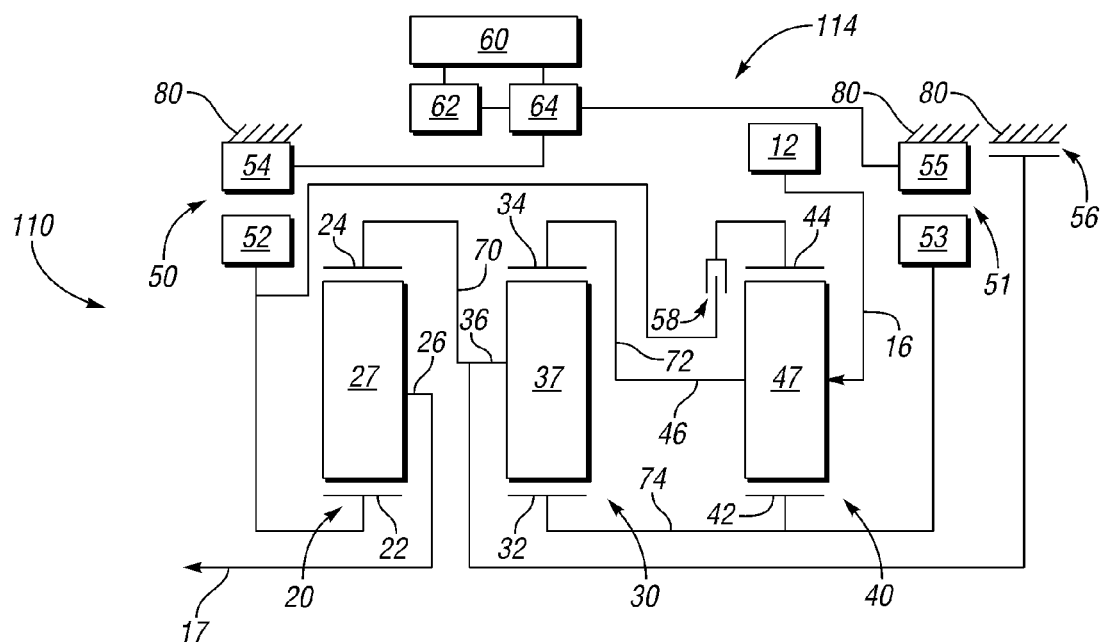
FIG. 3 is a schematic stick diagram illustration of a second embodiment of a hybrid powertrain.

FIG. 3 shows another embodiment of a hybrid powertrain 110 that includes a hybrid transmission 114 and is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers. The powertrain 110 and transmission 114 are identical to powertrain 10 and transmission 14 of FIG. 1 except that the positions of the input member 16 and the output member 17 are switched so that input member 16 is connected for common rotation with carrier member 46 and output member 17 is connected for common rotation with carrier member 26.

A series operating mode is established by engaging brake 56, not engaging clutch 58 (i.e., disengaging it if previously engaged), controlling motor/generator 51 to function as a generator, and controlling motor/generator 50 to function as a motor. With brake 56 engaged, carrier member 36 and ring gear member 24 are stationary. Torque from the engine 12 is supplied to the rotor 53 at a gear ratio established by the planetary gear set 30. The torque is converted to electrical energy stored in the battery 60 or transmitted directly to motor/generator 50 via inverter 64 to power motor/generator 50 to function as a motor, providing torque at the sun gear member 22. The torque is multiplied through the planetary gear set 20 and provided at the output member 17. Because ring gear member 44 is not connected to any other member or to the stationary member 80, planetary gear set 40 is inactive in the series operating mode.

As discussed above, a series operating mode requires two groups of gear members that are connected with one another for power transfer by the electrical connection between the two motor/generators. One group connects the engine 12 with the second motor/generator 51, and the other group connects the first motor/generator 50 with the output member 17. In the series operating mode, the first group of gear members provides power flow from the engine 12 to the motor/generator 51 (i.e., interconnected carrier member 46 and ring gear member 34, interconnected sun gear member 32 and sun gear member 42, and grounded carrier member 36). The second group of gear members includes those gear members providing a power flow path from the motor/generator 50 to the output member 17 (i.e., sun gear member 22, grounded ring gear member 24, and carrier member 26). Furthermore, in order to keep motor size relatively small, the motor generator 50 that drives the output member 17 in the series mode should have a geared ratio to the output member 17. This requires a grounded member, in this case ring gear member 24.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (carrier member 46) connected for rotation with the input member 16, a member (interconnected sun gear member 32 and sun gear member 42) connected for rotation with the motor/generator 51, a member (interconnected sun gear member 22 and ring gear member 44) connected for rotation with the motor/generator 50, and a member (carrier member 26) connected for rotation with the output member 17). A fifth member, the ring gear member 44, is not connected with any other gear set member in the series operating mode, and thus helps to separate the four required members into a first group and a second group as is necessary in the series operating mode as described above. Clutch 58 can then be engaged to transition to the compound-split operating mode so that the ring gear member 44 and sun gear member 22 are interconnected to function as a single member, and so that the interconnected carrier member 36 and ring gear member 24 are available to be grounded during a shift to the series operating mode, while still allowing the other four members to be moving, as is required for the series operating mode, thus satisfying the requirement of the compound-split operating mode that there are four members interconnected by differential gearing.

In the compound-split operating mode, the engine 12 provides torque at the carrier member 46 and the motor/generator 51 provides torque to or receives torque from the sun gear member 42. The torque from the engine 12 and the motor/generator 51 is combined through the planetary gear set 40 to flow to the interconnected carrier member 36 and ring gear member 24. Torque is provided from or to the motor/generator 50 at the sun gear member 22. Torque provided at sun gear member 22 from planetary gear set 40 and torque received from or provided to the motor/generator 51 at the sun gear member 22 is split through planetary gear set 20 to provide torque at the carrier member 26 and output member 17. Thus, the torque is split at planetary gear set 40 (input-split) and split again at planetary gear set 20 (output-split), making the operating mode a compound-split operating mode.

A switch from the series operating mode to the compound-split operating mode can occur with a synchronous shift of clutch 58 and brake 56 by controlling the motor/generator 50 to bring the speed of sun gear member 22 to the same speed as ring gear member 44. The gear members controlled to be at the same speed (sun gear member 22 and ring gear member 44) must be different than the four gear members required for series operation, as all of those gear members must be rotating in the series operating mode. Clutch 58 can then be engaged while brake 56 is released. There is no need to slip clutch 58 as there is no speed differential between the sun gear member 22 and ring gear member 44. Thus, there are no mechanical losses due to slipping.

Furthermore, clutch 58 can be engaged at this synchronous speed while clutch 56 remains engaged, establishing a fixed ratio operating mode. For example, if the ring gear member to sun gear member ratio of planetary gear set 20 is 3.0, of planetary gear set 30 is 1.5, and of planetary gear set 40 is 1.75, then if both clutch 58 and brake 56 are engaged, a fixed gear ratio of 1.65 will result between the input member 16 and the output member 17 when motor/generators 50 and 51 are not transmitting power.

When brake 56 is engaged, if the engine 12 is stopped, the motor/generator 51 can be controlled to operate as a motor to start the engine 12. Because clutch 58 is not engaged and motor/generator 50 is off, planetary gear sets 20 and 40 are inactive (do not carry torque) and torque is not transferred to the output member 17 while the engine 12 is being started. Furthermore, with brake 56 engaged, no torque can be transmitted from the input planetary gear set 20 to the other gear sets 30, 40 when the engine 12 is started.

During both the series operating mode and the compound-split operating mode, the motor/generator 50 can be controlled to operate as a generator to convert some of the torque at the output member 17 to electrical energy during vehicle braking. In compound-split operating mode, motor/generator 51 may also act as a generator to convert mechanical power into electrical power during vehicle braking.

Figure 4:
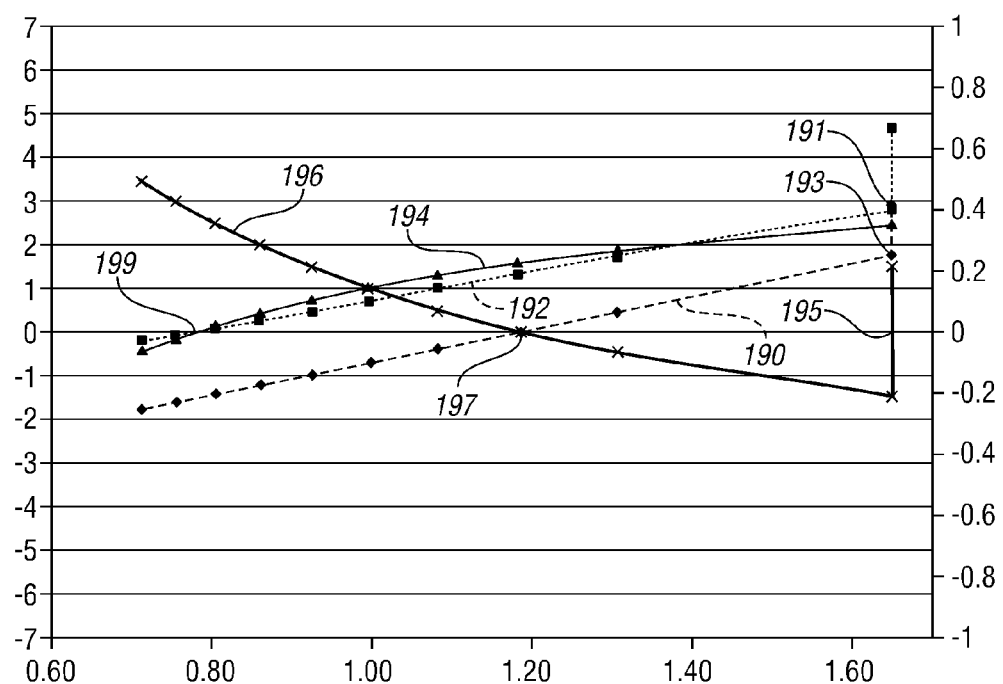
FIG. 4 is a chart showing the ratio of motor speed and torque to transmission input speed and torque respectively, versus transmission torque ratio for the powertrain of FIG. 3.

Referring to FIG. 4, the compound-split operating mode is illustrated with the relationship between the ratio of the torque of motor/generator 50 to the torque of the input member 16 versus the ratio of torque of the output member 17 to torque of the input member 16 is illustrated as curve 190. The relationship between the ratio of the torque of motor/generator 51 to the torque of the input member 16 versus the ratio of torque of the output member 17 to torque of the input member 16 is illustrated as curve 192. The relationship between the ratio of the speed of motor/generator 50 to the speed of the input member 16 versus the ratio of torque of the output member 17 to torque of the input member 16 is illustrated as curve 194. The relationship between the ratio of the speed of motor/generator 51 to the speed of the input member 16 versus the ratio of torque of the output member 17 to torque of the input member 16 is illustrated as curve 196.

FIG. 4 represents a compound-split operating mode of powertrain 110 assuming no battery power is used, and thus motor/generators 50 and 51 are power-balanced (i.e., the product of the speed and torque of motor/generator 50 is equal to the product of the speed and torque of motor/generator 51). At point 191, in series mode with brake 56 engaged, clutch 58 can be engaged. The transition from series mode to compound-split mode occurs at constant transmission torque ratio 1.65 (point 191 to 193), with motor/generator 51 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 114 can ratio up or down. In the maneuver represented by FIG. 4, the transmission 114 starts ratioing downward (i.e., to the left in FIG. 4) in compound-split mode after the constant-ratio transition from series operating mode to compound-split operating mode. Alternatively, with brake 56 still applied, the motor/generator 51 torque could be reduced to zero by moving to point 195 in FIG. 4. At this point, the transmission 114 is in fixed gear mode with 100% mechanical power transfer and no electrical loss. Note that in compound-split mode, there are two other points 197 and 199 where there is also 100% mechanical power transfer because one of the motor/generators 50 or 51 is stationary. However, at these points the motor torque is non-zero at the stationary motor, which consumes electrical power from the battery 60.

Transmission 114 is particularly beneficial as it is operable in an electric-only operating mode, with engine 12 off, brake 56 engaged, and clutch 58 disengaged. When motor/generator 50 is controlled to operate as a motor in this operating mode, only members of planetary gear set 20 rotate (i.e., sun gear member 22 and carrier member 26). Members of planetary gear set 30 and planetary gear set 40 do not rotate. Spin losses are thus minimized.

Figure 5:
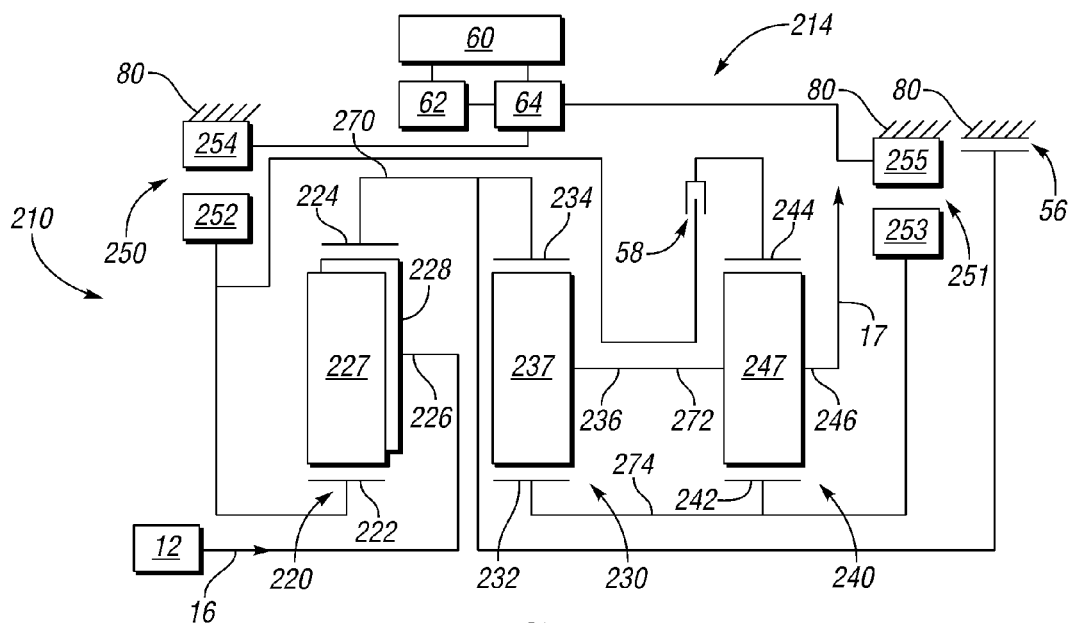
FIG. 5 is a schematic stick diagram illustration of a third embodiment of a hybrid powertrain.

FIG. 5 shows another embodiment of a hybrid powertrain 210 that includes a hybrid transmission 214 and that is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers.

The transmission 214 has three planetary gear sets 220, 230 and 240. Planetary gear set 220 is a dual planetary gear set, and planetary gear sets 230 and 240 are simple planetary gear sets. Planetary gear set 220 has a sun gear member 222, a ring gear member 224 and a carrier member 226. Pinion gears 227 rotatably supported on carrier member 226 mesh with sun gear member 222. Pinion gears 228 rotatably supported on carrier member 226 mesh with pinion gears 227 and with the ring gear member 224. Planetary gear set 230 has a sun gear member 232, a ring gear member 234 and a carrier member 236. Pinion gears 237 rotatably supported on carrier member 236 mesh with both the ring gear member 234 and the sun gear member 232. Planetary gear set 240 has a sun gear member 242, a ring gear member 244 and a carrier member 246. Pinion gears 247 rotatably supported on carrier member 246 mesh with both the ring gear member 244 and the sun gear member 242. The input member 16 is continuously connected for common rotation with the carrier member 226. The output member 17 is continuously connected for common rotation with the carrier member 246.

The transmission 214 includes a first motor/generator 250 and a second motor/generator 251. Motor/generator 250 has a rotor 252 connected for common rotation with sun gear member 222 and a stator 254 grounded to the stationary member 80. Second motor/generator 251 has a rotor 253 connected for common rotation with sun gear member 242 and sun gear member 232, and a stator 255 grounded to the stationary member 80. The battery 60 is operatively connected by transfer conductors to the stators 254, 255. The controller 62 controls electrical transfer between the battery 60 and the stators 254, 255 through the power inverter 64.

Ring gear member 224 and ring gear member 234 are continuously connected for common rotation with one another by a first interconnecting member 270. Carrier member 236 is continuously connected for common rotation with carrier member 246 and with the output member 17 by a second interconnecting member 272. Sun gear member 232 and sun gear member 242 are connected for common rotation with one another and with motor/generator 251 by a third interconnecting member 274. None of the interconnecting members 270, 272, 274 connect to members of all three of the planetary gear sets 220, 230, 240; that is, the interconnecting members 270, 272, 274 each interconnect only two members of two different planetary gear sets. Furthermore, interconnecting members 272 and 274 are a pair of interconnecting members each of which interconnects a respective member of the planetary gear set 230 to a respective member of the planetary gear set 240 so that two different members of the planetary gear set 230 are connected for common rotation with two different members of the planetary gear set 240. As used herein, planetary gear set 220 is a first planetary gear set, planetary gear set 230 is a second planetary gear set, and planetary gear set 240 is a third planetary gear set. Carrier member 226 is a first member, sun gear member 222 is a second member, and ring gear member 224 is a third member of the planetary gear set 220. Ring gear member 234 is a first member, carrier member 236 is a second member, and sun gear member 232 is a third member of planetary gear set 30. Carrier member 246 is a first member, sun gear member 242 is a second member, and ring gear member 244 is a third member of planetary gear set 240.

The transmission 214 includes only the two torque transmitting mechanisms 56 and 58. In this embodiment, brake 56 is selectively engageable to ground the ring gear member 224 and ring gear member 234 to the stationary member 80 by grounding interconnecting member 270. Clutch 58 is selectively engageable to connect ring gear member 244 for common rotation with sun gear member 222 and motor/generator 250. By controlling the motor/generators 250, 251, the clutch 58 and the brake 56, multiple different operating modes are available for forward propulsion. The motor/generators 250, 251 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 250 to function as a generator, and controlling motor/generator 251 to function as a motor. With brake 56 engaged, ring gear member 224 and ring gear member 234 are stationary. Torque from the engine 12 is supplied to the rotor 252 at a gear ratio established by the planetary gear set 220. The torque is converted to electrical energy stored in the battery 60 or transmitted directly to motor/generator 251 via inverter 64 to power motor/generator 251 to function as a motor, providing torque at the sun gear member 232. The torque is multiplied through the planetary gear set 230 and provided at the output member 17. Because ring gear member 244 is not connected to any other member or to the stationary member 80, planetary gear set 240 is inactive in the series operating mode.

As discussed above, a series operating mode requires two groups of gear members that are connected with one another for power transfer only by the electrical connection between the two motor/generators. One group connects the engine 12 with the first motor/generator 250, and the other group connects the second motor/generator 251 with the output member 17. In the series operating mode, the first group of gear members provides a power flow path from the engine 12 to the motor/generator 250 (i.e., carrier member 226, grounded ring gear member 224, and sun gear member 222). The second group of gear members provides a power flow path from the motor/generator 251 to the output member 17 (i.e., sun gear member 232, grounded ring gear member 234, and carrier member 236). Furthermore, in order to keep motor size relatively small, the motor generator 251 that drives the output member 17 in the series mode should have a geared ratio to the output member 17. This requires a grounded member, in this case ring gear member 234.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (carrier member 226) connected for rotation with the input member 16, a member (sun gear member 222) connected for rotation with the motor/generator 250, a member (interconnected sun gear members 232, 242) connected for rotation with the motor/generator 251, and a member (interconnected carrier members 236, 246) connected for common rotation with the output member 17). A fifth member, the ring gear member 244, is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 222 and ring gear member 244 are interconnected to function as a single member, thus satisfying the requirement of the compound-split operating mode that there are four members interconnected by differential gearing.

In the compound-split operating mode, the engine 12 provides torque at the carrier member 226 and the motor/generator 250 provides torque to or receives torque from the sun gear member 222. The torque from the engine 12 and the motor/generator 250 is combined through the planetary gear set 220 to flow to the interconnected ring gear member 224 and ring gear member 234. Torque is provided from or to the motor/generator 251 at the interconnected sun gear member 232 and sun gear member 242. Torque from the engine 12 and motor/generator 250 provided at ring gear member 234 and torque received from or provided to the motor/generator 251 at the sun gear member 232 is split through planetary gear set 230 to provide torque at the carrier member 236 and output member 17. Thus, the torque is split at planetary gear set 220 (input-split) and split again at planetary gear set 230 (output-split), making the operating mode a compound-split operating mode.

A switch from the series operating mode to the compound-split operating mode can occur with a synchronous shift of clutch 58 and brake 56 by controlling the motor/generator 250 to bring the speed of sun gear member 222 to the same speed as ring gear member 244. Clutch 58 can then be engaged while brake 56 is released. There is no need to slip clutch 58 as there is no speed differential between the sun gear member 222 and the ring gear member 244. Thus, there are no mechanical losses due to slipping.

Furthermore, clutch 58 can be engaged at this synchronous speed while 56 remains engaged, establishing a fixed ratio operating mode. For example, if the ring gear member to sun gear member ratio of planetary gear set 220 is 1.75, of planetary gear set 230 is 3.0, and of planetary gear set 240 is 1.5, then if both clutch 58 and brake 56 are engaged, a fixed gear ratio of 1.33 will result between the input member 16 and the output member 17 when motor/generators 250 and 251 are not transmitting power.

An electric-only operating mode is established if the engine 12 is stopped, brake 56 is engaged, and motor/generator 251 is operated as a motor for forward propulsion.

When brake 56 is engaged, if the engine 12 is stopped, the motor/generator 250 can be controlled to operate as a motor to start the engine 12. Because clutch 58 is not engaged, planetary gear set 240 is inactive (does not carry torque). Also, motor/generator 251 may be off so that planetary gear set 230 is also inactive, and torque is not transferred to the output member 17 while the engine 12 is being started.

During both the series operating mode and the compound-split operating mode, the motor/generator 251 can be controlled to operate as a generator to convert some of the torque at the output member 17 to electrical energy during vehicle braking.

Figure 6:
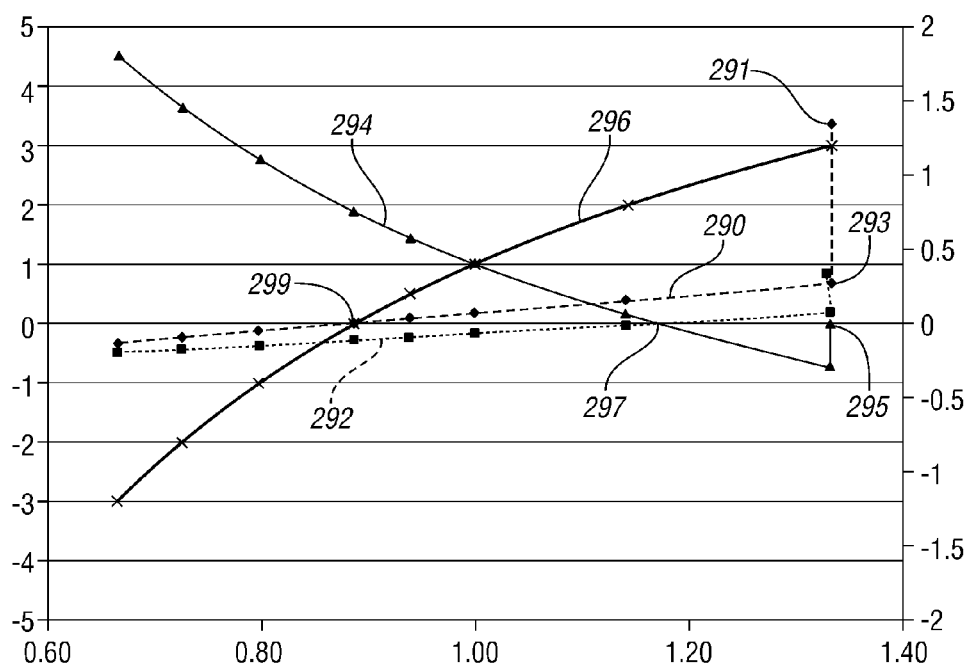
FIG. 6 is a chart showing the ratio of motor speed and torque to transmission input speed and torque respectively, versus transmission torque ratio for the powertrain of FIG. 5.

Referring to FIG. 6, the compound-split operating mode is illustrated with the relationship between the ratio of the torque of motor/generator 250 to the torque of the input member 16 versus the ratio of torque of the input member 16 to torque of the output member 17 is illustrated as curve 290. The relationship between the ratio of the torque of motor/generator 251 to the torque of the input member 16 versus the ratio of torque of the output member 17 to torque of the input member 16 is illustrated as curve 292. The relationship between the ratio of the speed of motor/generator 250 to the speed of the input member 16 versus the ratio of torque of the output member 17 to torque of the input member 16 is illustrated as curve 294. The relationship between the ratio of the speed of motor/generator 251 to the speed of the input member 16 versus the ratio of torque of the output member 17 to torque of the input member 16 is illustrated as curve 296.

FIG. 6 represents a compound-split operating mode of powertrain 210 assuming no battery power is used, and thus motor/generators 250 and 251 are power-balanced (i.e., the product of the speed and torque of motor/generator 250 is equal to the product of the speed and torque of motor/generator 251). At point 291, in series mode with brake 56 engaged, clutch 58 can be engaged. The transition from series mode to compound-split mode occurs at constant transmission torque ratio 1.33 (point 291 to point 293), with motor/generator 250 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 214 can ratio up or down. In the maneuver represented by FIG. 6, the transmission 214 starts ratioing downward in torque ratio (i.e., to the left in FIG. 6) in compound-split mode after the constant-ratio transition from series operating mode to compound-split operating mode. Alternatively, the motor/generator 250 torque could be reduced to zero by moving to point 295 in FIG. 6. At this point, the transmission 214 is in fixed gear mode with 100% mechanical power transfer and no electrical loss. Note that in compound-split mode, there are two other points 297 and 299 where there is also 100% mechanical power transfer because one of the motor/generators 250 or 251 is stationary. However, at these points the motor torque is non-zero at the stationary motor, which consumes electrical power from the battery 60.

Figure 7:
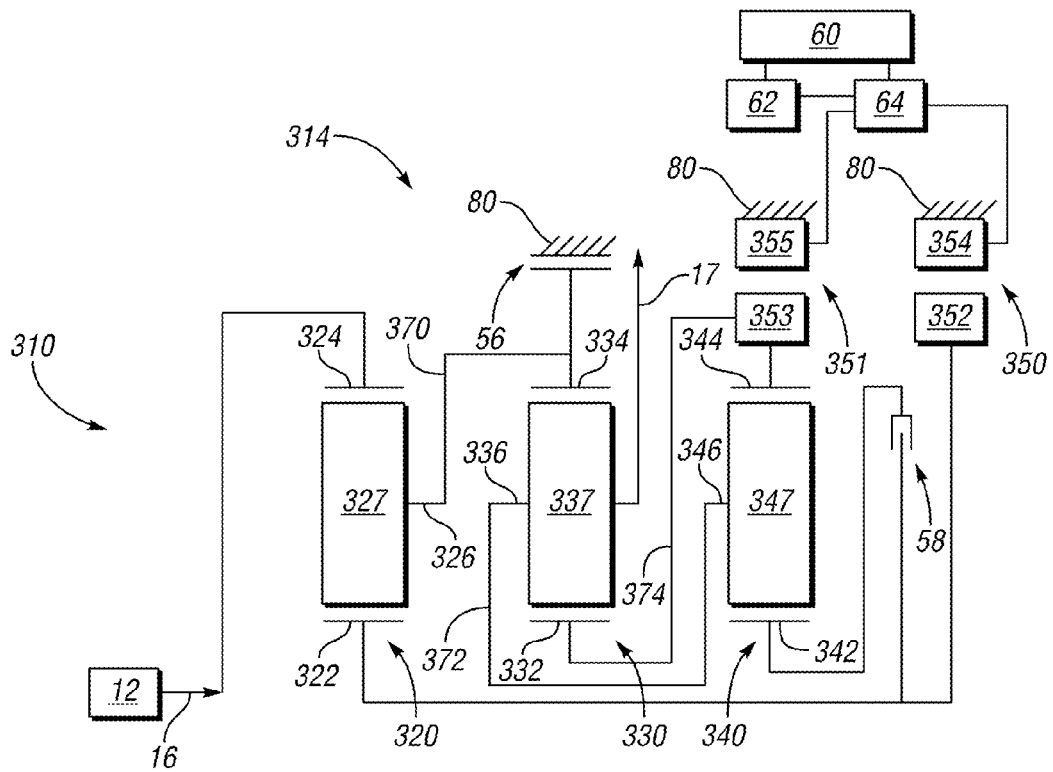
FIG. 7 is a schematic stick diagram illustration of a fourth embodiment of a hybrid powertrain.

FIG. 7 shows another embodiment of a hybrid powertrain 310 that includes a hybrid transmission 314 and is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers.

The transmission 314 has three planetary gear sets 320, 330 and 340, each of which is a simple planetary gear set. Planetary gear set 320 has a sun gear member 322, a ring gear member 324 and a carrier member 326. Pinion gears 327 rotatably supported on carrier member 326 mesh with both the ring gear member 324 and the sun gear member 322. Planetary gear set 330 has a sun gear member 332, a ring gear member 334 and a carrier member 336. Pinion gears 337 rotatably supported on carrier member 336 mesh with both the ring gear member 334 and the sun gear member 332. Planetary gear set 340 has a sun gear member 342, a ring gear member 344 and a carrier member 346. Pinion gears 347 rotatably supported on carrier member 346 mesh with both the ring gear member 344 and the sun gear member 342. The input member 16 is continuously connected for common rotation with the ring gear member 324. The output member 17 is continuously connected for common rotation with the carrier member 336.

The transmission 314 includes a first motor/generator 350 and a second motor/generator 351. Motor/generator 350 has a rotor 352 connected for common rotation with sun gear member 322 and a stator 354 grounded to the stationary member 80. Second motor/generator 351 has a rotor 353 and a stator 355. Stator 355 is grounded to the stationary member 80. The battery 60 is operatively connected by transfer conductors to the stators 354, 355. The controller 62 controls electrical transfer between the battery 60 and the stators 354, 355 through the power inverter 64.

Carrier member 326 and ring gear member 334 are continuously connected for common rotation with one another by a first interconnecting member 370. Carrier member 336 is continuously connected for common rotation with carrier member 346 and with output member 17 by second interconnecting member 372. Sun gear member 332 and ring gear member 334 are connected for common rotation with rotor 353 by third interconnecting member 374. None of the interconnecting members 370, 372, 374 connect to members of all three of the planetary gear sets 320, 330, 340; that is, the interconnecting members 370, 372, 374 each interconnect only two members of two different planetary gear sets. Furthermore, interconnecting members 372 and 374 are a pair of interconnecting members each of which interconnects a respective member of the planetary gear set 330 to a respective member of the planetary gear set 340 so that two different members of the planetary gear set 330 are connected for common rotation with two different members of the planetary gear set 340. As used herein, planetary gear set 320 is a first planetary gear set, planetary gear set 330 is a second planetary gear set, and planetary gear set 340 is a third planetary gear set. Ring gear member 324 is a first member, sun gear member 322 is a second member, and carrier member 326 is a third member of the planetary gear set 320. Ring gear member 334 is a first member, carrier member 336 is a second member, and sun gear member 332 is a third member of planetary gear set 330. Carrier member 346 is a first member, ring gear member 344 is a second member, and sun gear member 342 is a third member of planetary gear set 340.

The transmission 314 includes only the two torque transmitting mechanisms 56 and 58. In this embodiment, brake 56 is selectively engageable to ground the carrier member 326 and ring gear member 334 to the stationary member 80 by grounding interconnecting member 370. Clutch 58 is selectively engageable to connect the sun gear member 342 and the carrier member 346, for common rotation with the sun gear member 322 and the rotor 352. By controlling the motor/generators 350, 351, the clutch 58 and the brake 56, multiple different operating modes are available for forward propulsion. The motor/generators 350, 351 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 350 to function as a generator, and controlling motor/generator 351 to function as a motor. With brake 56 engaged, ring gear member 334 and carrier member 326 are stationary. Torque from the engine 12 is supplied to the rotor 352 at a gear ratio established by the planetary gear set 320. The torque is converted to electrical energy stored in the battery 60 or transmitted directly to motor/generator 351 via inverter 64 to power motor/generator 351 to function as a motor, providing torque at the sun gear member 332. The torque is multiplied through the planetary gear set 330 and provided at the output member 17. Because sun gear member 342 is not connected to any other member or to the stationary member 80, planetary gear set 340 is inactive in the series operating mode.

As discussed above, a series operating mode requires two groups of gear members that are connected with one another for power transfer only by the electrical connection between the two motor/generators. One group establishes a power flow path from the engine 12 to the first motor/generator 350, and the other group establishes a power flow path from the second motor/generator 351 to the output member 17. In the series operating mode, the gear members of the first group include ring gear member 324, carrier member 326 and sun gear member 322. The gear members of the second group include sun gear member 332, carrier member 336, and ring gear member 334. Furthermore, in order to keep motor size relatively small, the motor generator 351 that drives the output member 17 in the series mode should have a geared ratio to the output member 17. This requires a grounded member, in this case ring gear member 334.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (ring gear member 324) connected for rotation with the input member 16, a member (sun gear member 322) connected for rotation with the motor/generator 350, a member (sun gear member 332) connected for rotation with the motor/generator 351, and a member (interconnected carrier member 336 and carrier member 346) connected for rotation with the output member 17). A fifth member, the sun gear member 342, is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 342 and sun gear member 322 are interconnected to function as a single fifth member, while still allowing the other four members to be moving, as is required for the series operating mode, thus satisfying the requirement of the compound-split operating mode that there are four members interconnected by differential gearing.

In the compound-split operating mode, the engine 12 provides torque at the ring gear member 324 and the motor/generator 350 provides torque to or receives torque from the sun gear member 322 and sun gear member 342. The torque from the engine 12 and the motor/generator 350 is combined through the planetary gear set 320 to flow to the interconnected ring gear member 334 and carrier member 326. Torque is provided from or to the motor/generator 351 at sun gear member 332. Torque provided at ring gear member 334 and torque received from or provided to the motor/generator 351 at the sun gear member 332 is split through planetary gear set 330 to provide torque at the carrier gear member 336 and output member 17. Thus, the torque is split at planetary gear set 320 (input-split) and split again at planetary gear set 330 (output-split), making the operating mode a compound-split operating mode.

A switch from the series operating mode to the compound-split operating mode can occur with a synchronous shift of clutch 58 and brake 56 by controlling the motor/generator 350 to bring the speed of sun gear member 322 to the same speed as sun gear member 342. Clutch 58 can then be engaged while brake 56 is released. There is no need to slip clutch 58 as there is no speed differential between the sun gear members 322, 342. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratio of planetary gear set 320 is 1.75, of planetary gear set 330 is 3.0, and of planetary gear set 340 is 1.5, then if both clutch 58 and brake 56 are engaged, a fixed gear ratio of 2.00 will result between the input member 16 and the output member 17 when motor/generators 350 and 351 are not transmitting power.

An electric-only operating mode is established if the engine 12 is stopped, brake 56 is engaged, and motor/generator 351 is operated as a motor for forward propulsion.

When brake 56 is engaged, if the engine 12 is stopped, the motor/generator 350 can be controlled to operate as a motor to start the engine 12. Because clutch 58 is not engaged and motor/generator 351 is off so rotor 353 can freewheel, planetary gear sets 330 and 340 are inactive (do not carry torque) and torque is not transferred to the output member 17 while the engine 12 is being started.

During both the series operating mode and the compound-split operating mode, the motor/generator 351 can be controlled to operate as a generator to convert some of the torque at the output member 17 to electrical energy during vehicle braking. During compound-split operating mode, motor/generator 350 may also act as a generator to convert mechanical power to electrical power.

Figure 8:
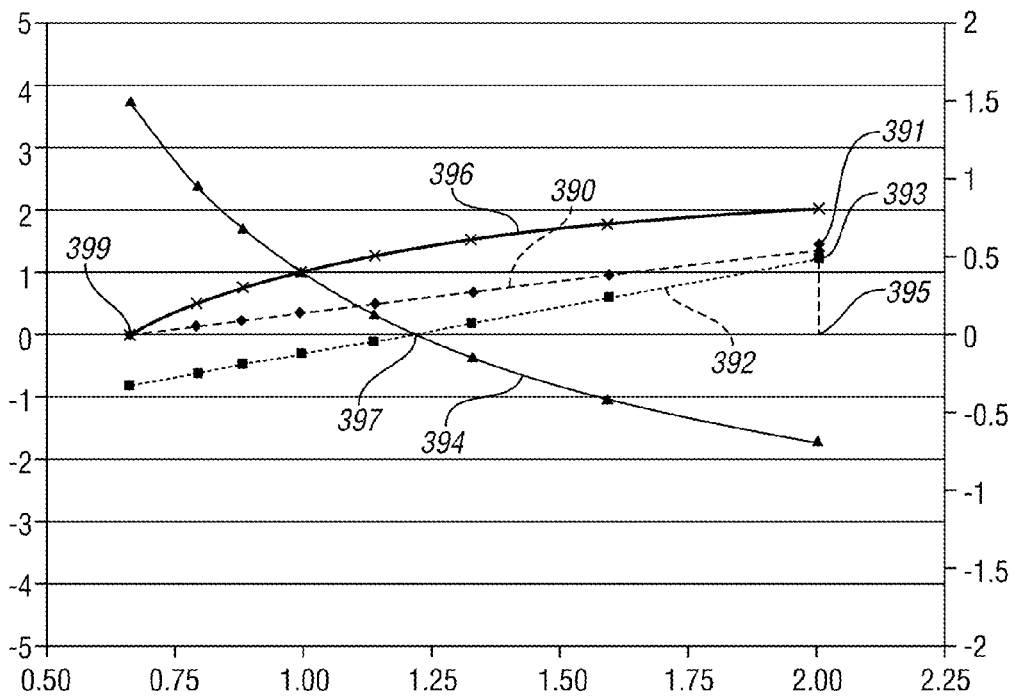
FIG. 8 is a chart showing the ratio of motor speed and torque to transmission input speed and torque respectively, versus transmission torque ratio for the powertrain of FIG. 7.

Referring to FIG. 8, the compound-split operating mode is illustrated with the relationship between the ratio of the torque of motor/generator 350 to the torque of the input member 16 versus the ratio of torque of the output member 17 to torque of the input member 16 is illustrated as curve 390. The relationship between the ratio of the torque of motor/generator 351 to the torque of the input member 16 versus the ratio of torque of the output member 17 to torque of the input member 16 is illustrated as curve 392. The relationship between the ratio of the speed of motor/generator 350 to the speed of the input member 16 versus the ratio of torque of the output member 17 to torque of the input member 16 is illustrated as curve 394. The relationship between the ratio of the speed of motor/generator 351 to the speed of the input member 16 versus the ratio of torque of the output member 17 to torque of the input member 16 is illustrated as curve 396.

FIG. 8 represents a compound-split operating mode of powertrain 310 assuming no battery power is used, and thus motor/generators 350 and 351 are power-balanced (i.e., the product of the speed and torque of motor/generator 350 is equal to the product of the speed and torque of motor/generator 351). At point 391, in series mode with brake 56 engaged, clutch 58 can be engaged. The transition from series mode to compound-split mode occurs at constant transmission torque ratio 2.0 (point 391 to point 393), with motor/generator 351 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 314 can ratio up or down. In the maneuver represented by FIG. 8, the transmission 314 starts ratioing downward (i.e., to the left in FIG. 8) in compound-split mode after the constant-ratio transition from series operating mode to compound-split operating mode. Alternatively, the motor/generator 351 torque could be held at zero moving only from point 391 to point 395 in FIG. 8. At this point, the transmission 314 is in fixed gear mode with 100% mechanical power transfer and no electrical loss. Note that in compound-split mode, there are two other points 397 and 399 where there is also 100% mechanical power transfer because one of the motor/generators 350 or 351 is stationary. However, at these points the motor torque is non-zero at the stationary motor, which consumes electrical power from the battery 60.

Figure 9:
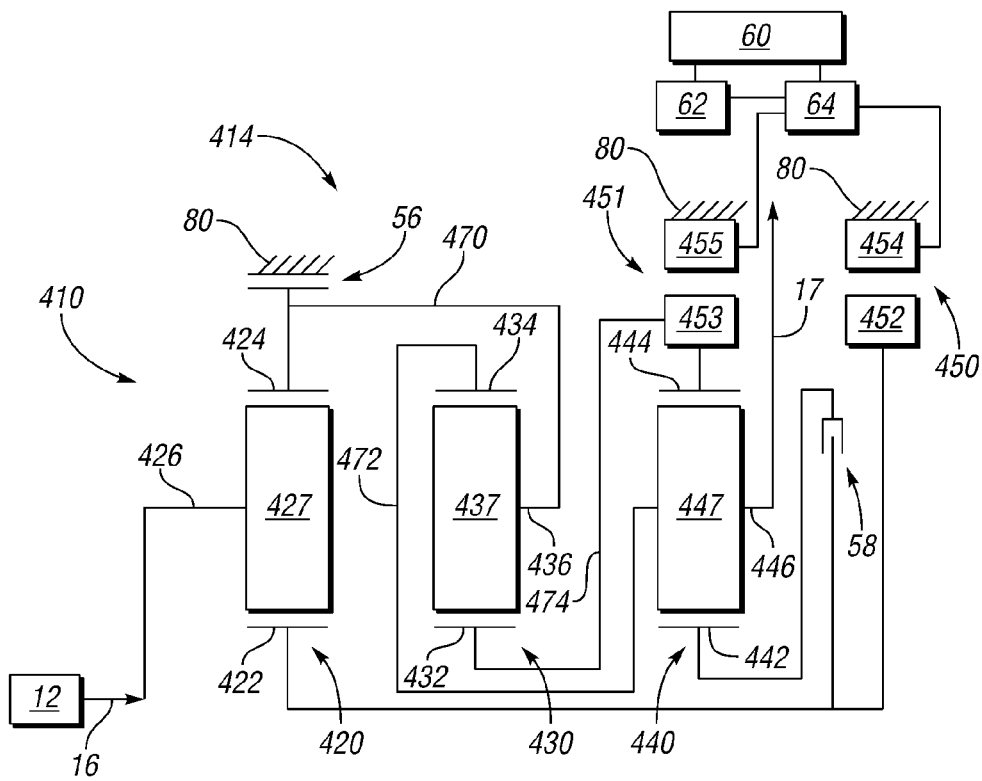
FIG. 9 is a schematic stick diagram illustration of a fifth embodiment of a hybrid powertrain.

FIG. 9 shows another embodiment of a hybrid powertrain 410 that includes a hybrid transmission 414 and is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers.

The transmission 414 has three planetary gear sets 420, 430 and 440, each of which is a simple planetary gear set. Planetary gear set 420 has a sun gear member 422, a ring gear member 424 and a carrier member 426. Pinion gears 427 rotatably supported on carrier member 426 mesh with both the ring gear member 424 and the sun gear member 422. Planetary gear set 430 has a sun gear member 432, a ring gear member 434 and a carrier member 436. Pinion gears 437 rotatably supported on carrier member 436 mesh with both the ring gear member 434 and the sun gear member 432. Planetary gear set 440 has a sun gear member 442, a ring gear member 444 and a carrier member 446. Pinion gears 447 rotatably supported on carrier member 446 mesh with both the ring gear member 444 and the sun gear member 442. The input member 16 is continuously connected for common rotation with the carrier member 426. The output member 17 is continuously connected for common rotation with the carrier member 446.

The transmission 414 includes a first motor/generator 450 and a second motor/generator 451. Motor/generator 450 has a rotor 452 connected for common rotation with sun gear member 422 and a stator 454 grounded to the stationary member 80. Second motor/generator 451 has a rotor 453 connected for common rotation with sun gear member 432 and ring gear member 444, and a stator 455. Stator 455 is grounded to the stationary member 80. The battery 60 is operatively connected by transfer conductors to the stators 454, 455. The controller 62 controls electrical transfer between the battery 60 and the stators 454, 455 through the power inverter 64.

Ring gear member 424 and carrier member 436 are continuously connected for common rotation with one another by a first interconnecting member 470. Ring gear member 434 is continuously connected for common rotation with carrier member 446 and with output member 17 by second interconnecting member 472. Sun gear member 432 and ring gear member 444 are connected for common rotation with rotor 453 by third interconnecting member 474. None of the interconnecting members 470, 472, 474 connect to members of all three of the planetary gear sets 420, 430, 440; that is, the interconnecting members 470, 472, 474 each interconnect only two members of two different planetary gear sets. Furthermore, interconnecting members 472 and 474 are a pair of interconnecting members each of which interconnects a respective member of the planetary gear set 430 to a respective member of the planetary gear set 440 so that two different members of the planetary gear set 430 are connected for common rotation with two different members of the planetary gear set 440. As used herein, planetary gear set 420 is a first planetary gear set, planetary gear set 430 is a second planetary gear set, and planetary gear set 440 is a third planetary gear set. Carrier member 426 is a first member, sun gear member 422 is a second member, and ring gear member 424 is a third member of the planetary gear set 420. Carrier member 436 is a first member, ring gear member 434 is a second member, and sun gear member 432 is a third member of planetary gear set 430. Carrier member 446 is a first member, ring gear member 444 is a second member, and sun gear member 442 is a third member of planetary gear set 440.

The transmission 414 includes only the two torque transmitting mechanisms 56 and 58. In this embodiment, brake 56 is selectively engageable to ground the carrier member 436 and ring gear member 424 to the stationary member 80 by grounding interconnecting member 470. Clutch 58 is selectively engageable to connect the sun gear member 442 for common rotation with the sun gear member 422 and the rotor 452. By controlling the motor/generators 450, 451, the clutch 58 and the brake 56, multiple different operating modes are available for forward propulsion. The motor/generators 450, 451 may also capture braking energy in a regenerative braking mode and be controlled to start the engine 12 either from a cold start or from a stop/start (i.e., when temporarily shut off while the vehicle is being operated in another mode).

A series operating mode is established by engaging brake 56, not engaging clutch 58 (i.e., disengaging it if previously engaged), controlling motor/generator 450 to function as a generator, and controlling motor/generator 451 to function as a motor. With brake 56 engaged, ring gear member 424 and carrier member 436 are stationary. Torque from the engine 12 is supplied to the rotor 452 at a gear ratio established by the planetary gear set 420. The torque is converted to electrical energy stored in the battery 60 or transmitted directly to motor/generator 451 via inverter 64 to power motor/generator 451 to function as a motor, providing torque at the sun gear member 432. The torque is multiplied through the planetary gear set 430 and provided at the ring gear member 434 and output member 17. Because sun gear member 442 is not connected to any other member or to the stationary member 80, planetary gear set 440 is inactive in the series operating mode.

As discussed above, a series operating mode requires two groups of gear members that are connected with one another for power transfer only by the electrical connection between the two motor/generators. One group establishes a power flow path from the engine 12 to the first motor/generator 450, and the other group establishes a power flow path from the second motor/generator 451 to the output member 17. In the series operating mode, the gear members of the first group include carrier member 426, ring gear member 424 and sun gear member 422. The gear members of the second group include sun gear member 432, carrier member 436, and ring gear member 434. Furthermore, in order to keep motor size relatively small, the motor generator 451 that drives the output member 17 in the series mode should have a geared ratio to the output member 17. This requires a grounded member, in this case ring gear member 434.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (carrier member 426) connected for rotation with the input member 16, a member (sun gear member 422) connected for rotation with the motor/generator 450, a member (sun gear member 432) connected for rotation with the motor/generator 451, and a member (interconnected ring gear member 434 and carrier member 446) connected for rotation with the output member 17). A fifth member, the sun gear member 442, is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 422 and sun gear member 442 are interconnected to function as a single member, thus satisfying the requirement of the compound-split operating mode that there are four members interconnected by differential gearing.

In the compound-split operating mode, the engine 12 provides torque at the carrier member 426 and the motor/generator 450 provides torque to or receives torque from the sun gear member 422 and sun gear member 442. The torque from the engine 12 and the motor/generator 450 is combined through the planetary gear set 420 to flow to the interconnected ring gear member 424 and carrier member 436. Torque is provided from or to the motor/generator 451 at sun gear member 432. Torque provided at carrier member 436 and torque received from or provided to the motor/generator 451 at the sun gear member 432 is split through planetary gear set 430 to provide torque at the ring gear member 434 and output member 17. Thus, the torque is split at planetary gear set 420 (input-split) and split again at planetary gear set 430 (output-split), making the operating mode a compound-split operating mode.

A switch from the series operating mode to the compound-split operating mode can occur with a synchronous shift of clutch 58 and brake 56 by controlling the motor/generator 450 to bring the speed of sun gear member 422 to the same speed as sun gear member 442. Clutch 58 can then be engaged while brake 56 is released. There is no need to slip clutch 58 as there is no speed differential between the sun gear members 422, 442. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratio of planetary gear set 420 is 2.25, of planetary gear set 430 is 3.0, and of planetary gear set 440 is 1.5, then if both clutch 58 and brake 56 are engaged, a fixed gear ratio of 2.15 will result between the input member 16 and the output member 17 when motor/generators 450 and 451 are not transmitting power.

An electric-only operating mode is established if the engine 12 is stopped, brake 56 is engaged, and motor/generator 451 is operated as a motor for forward propulsion.

When brake 56 is engaged, if the engine 12 is stopped, the motor/generator 450 can be controlled to operate as a motor to start the engine 12. Because clutch 58 is not engaged and motor/generator 451 is off so rotor 453 can freewheel, planetary gear sets 430 and 440 are inactive (do not carry torque) and torque is not transferred to the output member 17 while the engine 12 is being started.

During both the series operating mode and the compound-split operating mode, the motor/generator 451 can be controlled to operate as a generator to convert some of the torque at the output member 17 to electrical energy during vehicle braking. During compound-split operating mode, motor/generator 450 may act as either a motor or generator depending on the transmission ratio.

Figure 10:
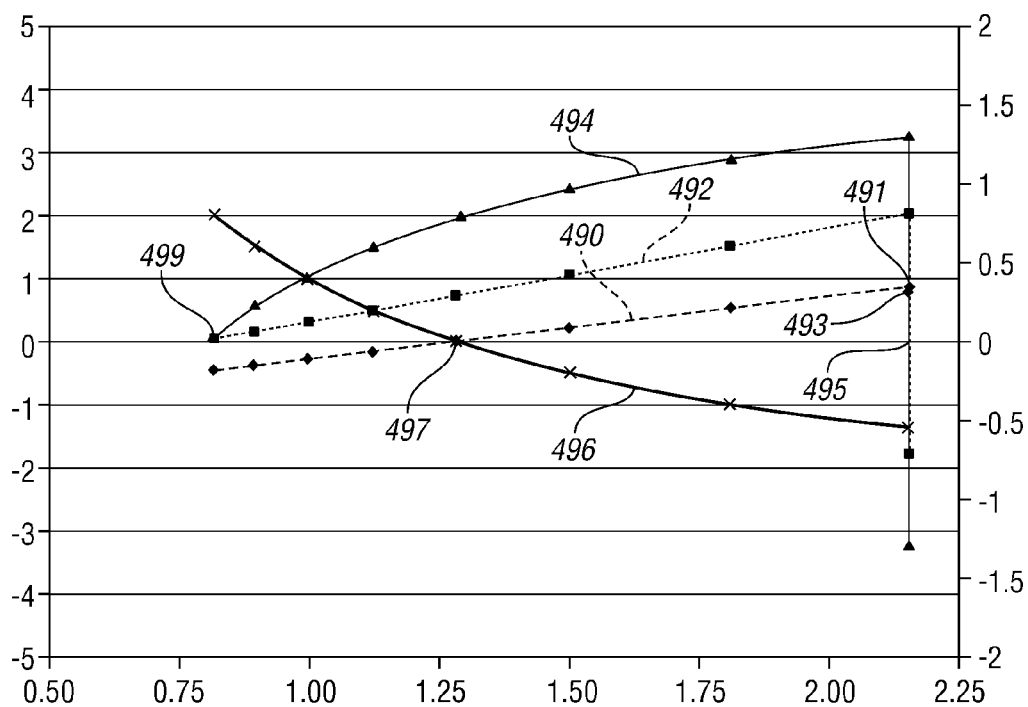
FIG. 10 is a chart showing the ratio of motor speed and torque to transmission input speed and torque respectively, versus transmission torque ratio for the powertrain of FIG. 9.

Referring to FIG. 10, the compound-split operating mode is illustrated with the relationship between the ratio of the torque of motor/generator 450 to the torque of the input member 16 versus the ratio of torque of the output member 17 to torque of the input member 16 is illustrated as curve 490. The relationship between the ratio of the torque of motor/generator 451 to the torque of the input member 16 versus the ratio of torque of the output member 17 to torque of the input member 16 is illustrated as curve 492. The relationship between the ratio of the speed of motor/generator 450 to the speed of the input member 16 versus the ratio of torque of the output member 17 to torque of the input member 16 is illustrated as curve 494. The relationship between the ratio of the speed of motor/generator 451 to the speed of the input member 16 versus the ratio of torque of the output member 17 to torque of the input member 16 is illustrated as curve 496.

FIG. 10 represents a compound-split operating mode of powertrain 410 assuming no battery power is used, and thus motor/generators 450 and 451 are power-balanced (i.e., the product of the speed and torque of motor/generator 450 is equal to the product of the speed and torque of motor/generator 451). At point 491, in series mode with brake 56 engaged, clutch 58 can be engaged. The transition from series mode to compound-split mode occurs at constant transmission torque ratio 2.15 (point 491 to point 493), with motor/generator 451 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded, it is disengaged and the transmission 414 can ratio up or down. In the maneuver represented by FIG. 10, the transmission 414 starts ratioing downward (i.e., to the left in FIG. 10) in compound-split mode after the constant-ratio transition from series operating mode to compound-split operating mode. Alternatively, the motor/generator 450 torque could be held at zero moving from point 491 to point 495 in FIG. 10. At this point, the transmission 414 is in fixed gear mode with 100% mechanical power transfer and no electrical loss. Note that in compound-split mode, there are two other points 497 and 499 where there is also 100% mechanical power transfer because one of the motor/generators 450 or 451 is stationary. However, at these points the motor torque is non-zero at the stationary motor, which consumes electrical power from the battery 60.

Figure 11:
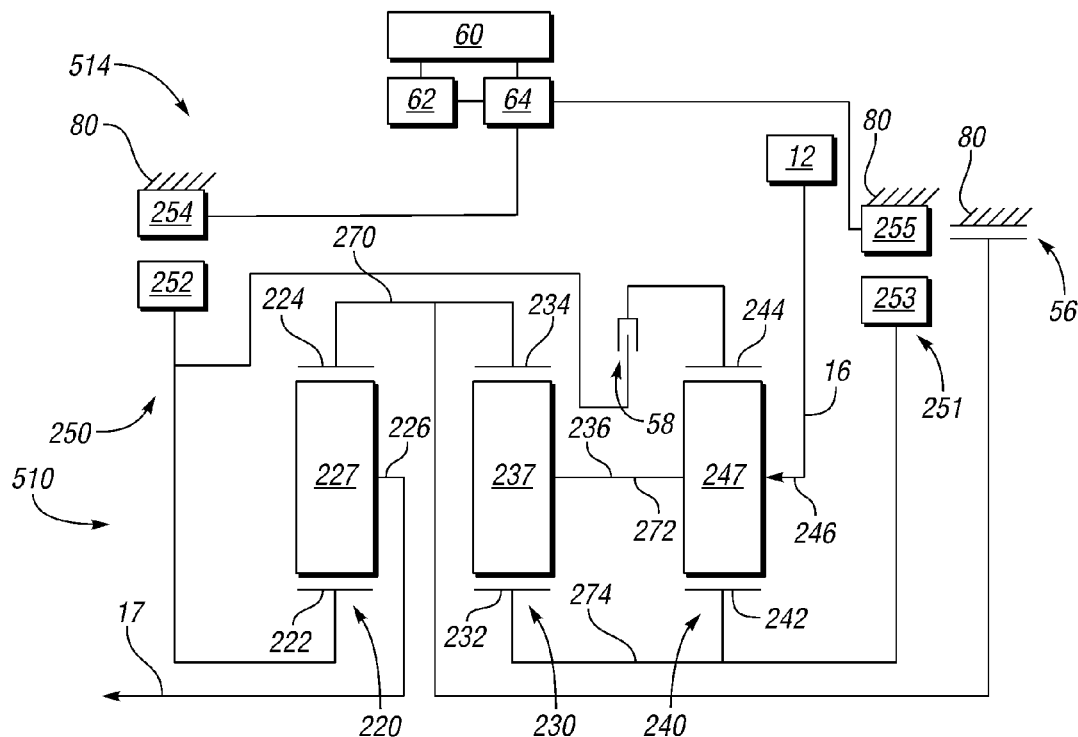
FIG. 11 is a schematic stick diagram illustration of a sixth embodiment of a hybrid powertrain.

FIG. 11 shows another embodiment of a hybrid powertrain 510 that includes a hybrid transmission 514 and is operable to provide tractive torque at the output member 17 in both a series hybrid operating mode and a compound-split hybrid operating mode, as discussed below. Components that are identical or substantially similar to those in FIGS. 1 and 2 are referred to with identical reference numbers. The powertrain 510 and transmission 514 are identical to powertrain 210 and transmission 214 of FIG. 5 except that the positions of the input member 16 and the output member 17 are switched so that input member 16 is connected for common rotation with carrier member 246 and output member 17 is connected for common rotation with carrier member 226.

A series operating mode is established by engaging brake 56, not engaging clutch 58 (i.e., disengaging it if previously engaged), controlling motor/generator 251 to function as a generator, and controlling motor/generator 250 to function as a motor. With brake 56 engaged, ring gear member 224 and ring gear member 234 are stationary. Torque from the engine 12 is supplied to the rotor 253 at a gear ratio established by the planetary gear set 240. The torque is converted to electrical energy stored in the battery 60 or transmitted directly to motor/generator 250 via inverter 64 to power motor/generator 250 to function as a motor, providing torque at the sun gear member 222. The torque is multiplied through the planetary gear set 220 and provided at the output member 17. Because ring gear member 244 is not connected to any other member or to the stationary member 80, planetary gear set 240 is inactive in the series operating mode.

As discussed above, a series operating mode requires two groups of gear members that are connected with one another for power transfer only by the electrical connection between the two motor/generators. One group connects the engine 12 with the second motor/generator 251, and the other group connects the first motor/generator 250 with the output member 17. In the series operating mode, the first group of gear members provides a power flow path from the engine 12 to the motor/generator 251 (i.e., carrier member 236, grounded ring gear member 234, and sun gear member 232). The second group of gear members provides a power flow path from the motor/generator 250 to the output member 17 (i.e., sun gear member 2322, grounded ring gear member 224, and carrier member 226). Furthermore, in order to keep motor size relatively small, the motor generator 250 that drives the output member 17 in the series mode should have a geared ratio to the output member 17. This requires a grounded member, in this case ring gear member 224.

A compound-split operating mode is provided when clutch 58 is engaged and brake 56 is not engaged (i.e., disengaging it if previously engaged). A compound-split operating mode requires four planetary gear set members that are not connected for common rotation with one another but that are connected with one another through differential gearing (i.e., one member (carrier member 246) connected for rotation with the input member 16, a member (interconnected sun gear members 232 and 242) connected for rotation with the motor/generator 251, a member (sun gear members 222) connected for rotation with the motor/generator 250, and a member (carrier member 226, 246) connected for common rotation with the output member 17). A fifth member, the ring gear member 244, is not connected with any other gear set member in the series operating mode, and thus helps to separate the four required members into a first group and a second group as is necessary in the series operating mode as described above. Clutch 58 can then be engaged to transition to the compound-split operating mode so that the sun gear member 222 and ring gear member 244 are interconnected to function as a single member, thus satisfying the requirement of the compound-split operating mode that there are four members interconnected by differential gearing.

In the compound-split operating mode, the engine 12 provides torque at the carrier member 226 and the motor/generator 251 provides torque to or receives torque from the sun gear members 232 and 234. The torque from the engine 12 and the motor/generator 251 is combined through the planetary gear set 230 to flow to the interconnected ring gear member 224 and ring gear member 234. Torque is provided from or to the motor/generator 250 at the sun gear member 222. Torque from the engine 12 and motor/generator 251 provided at ring gear member 224 and torque received from or provided to the motor/generator 250 at the sun gear member 222 is split through planetary gear set 220 to provide torque at the carrier member 226 and output member 17. Thus, the torque is split at planetary gear set 240 (input-split) and split again at planetary gear set 220 (output-split), making the operating mode a compound-split operating mode.

A switch from the series operating mode to the compound-split operating mode can occur with a synchronous shift of clutch 58 and brake 56 by controlling the motor/generator 250 to bring the speed of sun gear member 222 to the same speed as ring gear member 244. Clutch 58 can then be engaged while brake 56 is released. There is no need to slip clutch 58 as there is no speed differential between the sun gear member 222 and the ring gear member 244. Thus, there are no mechanical losses due to slipping.

Furthermore, clutch 58 can be engaged at this synchronous speed while brake 56 remains engaged, establishing a fixed ratio operating mode. For example, if the ring gear member to sun gear member ratio of planetary gear set 220 is 1.5, of planetary gear set 230 is 3.0, and of planetary gear set 240 is 1.6, then if both clutch 58 and brake 56 are engaged, a fixed gear ratio of 1.71 will result between the input member 16 and the output member 17 when motor/generators 250 and 251 are not transmitting power.

An electric-only operating mode is established if the engine 12 is stopped, brake 56 is engaged, and motor/generator 250 is operated as a motor for forward propulsion.

When brake 56 is engaged, if the engine 12 is stopped, the motor/generator 251 can be controlled to operate as a motor to start the engine 12. Because clutch 58 is not engaged, planetary gear set 240 is inactive (does not carry torque). Also, motor/generator 250 may be off so that planetary gear set 220 is also inactive, and torque is not transferred to the output member 17 while the engine 12 is being started.

During both the series operating mode and the compound-split operating mode, the motor/generator 250 can be controlled to operate as a generator to convert some of the torque at the output member 17 to electrical energy during vehicle braking.

Figure 12:
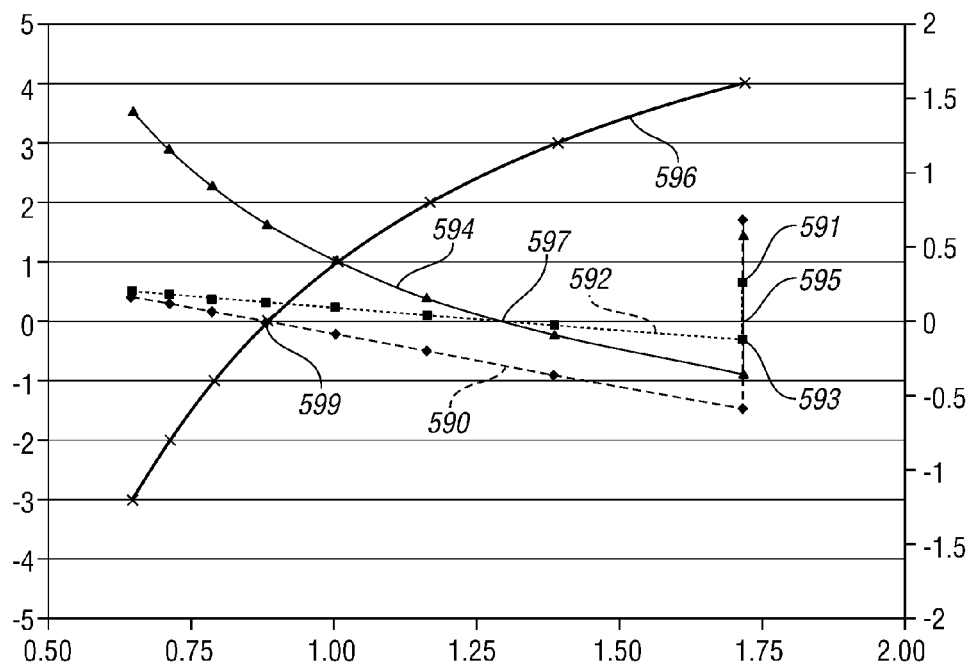
FIG. 12 is a chart showing the ratio of motor speed and torque to transmission input speed and torque respectively, versus transmission torque ratio for the powertrain of FIG. 11.

Referring to FIG. 12, the compound-split operating mode is illustrated with the relationship between the ratio of the torque of motor/generator 250 to the torque of the input member 16 versus the ratio of torque of the output member 17 to torque of the input member 16 illustrated as curve 590. The relationship between the ratio of the torque of motor/generator 251 to the torque of the input member 16 versus the ratio of torque of the output member 17 to torque of the input member 16 is illustrated as curve 592. The relationship between the ratio of the speed of motor/generator 250 to the speed of the input member 16 versus the ratio of torque of the output member 17 to torque of the input member 16 is illustrated as curve 594. The relationship between the ratio of the speed of motor/generator 251 to the speed of the input member 16 versus the ratio of torque of the output member 17 to torque of the input member 16 is illustrated as curve 596.

FIG. 12 represents a compound-split operating mode of powertrain 510 assuming no battery power is used, and thus motor/generators 250 and 251 are power-balanced (i.e., the product of the speed and torque of motor/generator 250 is equal to the product of the speed and torque of motor/generator 251). At point 591, in series mode with brake 56 engaged, clutch 58 can be engaged. The transition from series mode to compound-split mode occurs at constant transmission torque ratio 1.71 (point 591 to point 593), with motor/generator 251 reducing torque and thereby unloading torque on brake 56 and loading torque on clutch 58. At the same time, this increases the fraction of mechanical power directly transferred from engine 12 to output 17 from zero (series mode) to some intermediate split between mechanical and electrical power. When brake 56 is completely unloaded (at point 593), it is disengaged and the transmission 514 can ratio up or down. In the maneuver represented by FIG. 12, the transmission 514 starts ratioing downward in torque ratio (i.e., to the left in FIG. 12) in compound-split mode after the constant-ratio transition from series operating mode to compound-split operating mode. Alternatively, the motor/generator 251 torque could be reduced to zero by moving from point 593 to point 595 in FIG. 12, with torque at the brake 56 reloaded (and reversing in direction). At this point, the transmission 514 is in fixed gear mode with 100% mechanical power transfer and no electrical loss. Note that in compound-split mode, there are two other points 597 and 599 where there is also 100% mechanical power transfer because one of the motor/generators 250 or 251 is stationary. However, at these points the motor torque is non-zero at the stationary motor, which consumes electrical power from the battery 60.

Although the planetary gear sets 20, 30, 40; 220, 230, 240; 320, 330, 340; and 420, 430, 440 are illustrated and described as simple planetary gear sets, compound planetary gear sets and double pinion planetary gear sets may also be used within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A hybrid transmission operatively connected with an engine, comprising:
   an input member operatively connected with the engine;
   an output member;
   a plurality of selectively engageable torque-transmitting mechanisms;
   a gearing arrangement including a first, a second, and a third planetary gear set, each of said planetary gear sets having a first member, a second member, and a third member;
   a first, a second, and a third interconnecting member; wherein the second and the third interconnecting members each continuously connects a respective one of said members of said second planetary gear set for common rotation with a respective one of said members of said third planetary gear set;
   wherein the first interconnecting member continuously connects one of said members of said first planetary gear set for common rotation with one of said members of still said second planetary gear set; wherein none of said interconnecting members connect members of all three of said planetary gear sets for common rotation;
   a first motor/generator continuously operatively connected for common rotation only with one of the members of the first planetary gear set;
   a second motor/generator continuously operatively connected for common rotation with one of the members of the second planetary gear set and one of the members of the third planetary gear set;
   wherein a first of the torque-transmitting mechanisms is engaged to establish a hybrid series operating mode between the input member and the output member; and wherein a second of the torque-transmitting mechanisms is engaged to establish a compound-split operating mode between the input member and the output member.

2. The transmission of claim 1, wherein a shift between the hybrid series operating mode and the compound-split operating mode is synchronous without slipping either of the first and the second torque-transmitting mechanisms.

3. The hybrid transmission of claim 1, wherein the plurality of selectively engageable torque-transmitting mechanisms includes only the first and the second torque-transmitting mechanisms.

4. The hybrid transmission of claim 1, wherein powerflow from a first group of the members of the planetary gear sets to a second group of the members of the planetary gear sets is via an electrical path through the motor/generators in the series operating mode; and wherein powerflow from the first group of the members of the planetary gear sets to the second group of the members of the planetary gear sets is via a mechanical path established by engaging the second torque-transmitting mechanism in the compound-split operating mode.

5. The hybrid transmission of claim 1, wherein one of the input member and the output member is connected for common rotation with a first member of the first planetary gear set; wherein the first motor/generator is connected for common rotation with a second member of the first planetary gear set; wherein the third member of the first planetary gear set is selectively grounded to the stationary member by engagement of the first torque-transmitting mechanism and is continuously connected for common rotation with the first member of the second planetary gear set;

wherein the second motor/generator is continuously connected for common rotation with the third member of the second planetary gear set and with the second member of the third planetary gear set; wherein the other of the input member and the output member is continuously connected for common rotation with the first member of the third planetary gear set; and wherein the second torque-transmitting mechanism is selectively engageable to connect the second member of the first planetary gear set for common rotation with the third member of the third planetary gear set.

6. The hybrid transmission of claim 5, wherein the first member of the first planetary gear set is a carrier member, the second member of the first planetary gear set is a sun gear member, and the third member of the first planetary gear set is a ring gear member; wherein the first member of the second planetary gear set is a carrier member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

7. The hybrid transmission of claim 5, wherein the first member of the first planetary gear set is a carrier member, the second member of the first planetary gear set is a sun gear member, and the third member of the first planetary gear set is a ring gear member; wherein the first member of the second planetary gear set is a ring gear member, the second member of the second planetary gear set is a carrier member, and the third member of the second planetary gear set is a sun gear member; and wherein the first member of the third planetary gear set is a carrier member, the second member of the third planetary gear set is a sun gear member, and the third member of the third planetary gear set is a ring gear member.

8. The hybrid transmission of claim 5, wherein the first member of the first planetary gear set is a carrier member, the second member of the first planetary gear set is a sun gear member, and the third member of the first planetary gear set is a ring gear member; wherein the first member of the second planetary gear set is a carrier gear member, the second member of the second planetary gear set is a ring gear member, and the third member of the second planetary gear set is a sun gear member; and wherein the first member of the third planetary gear set is a carrier member, the second member of the third planetary gear set is a ring gear member, and the third member of the third planetary gear set is a sun gear member.

9. The hybrid transmission of claim 5, wherein the first member of the first planetary gear set is a carrier member, the second member of the first planetary gear set is a sun gear member, and the third member of the first planetary gear set is a ring gear member; wherein the first member of the second planetary gear set is a carrier gear member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

10. The hybrid transmission of claim 5, wherein the first member of the first planetary gear set is a carrier member, the second member of the first planetary gear set is a sun gear member, and the third member of the first planetary gear set is a ring gear member; wherein the first member of the second planetary gear set is a ring gear member, the second member of the second planetary gear set is a carrier member, and the third member of the second planetary gear set is a sun gear member; and wherein the first member of the third planetary gear set is a carrier member, the second member of the third planetary gear set is a sun gear member, and the third member of the third planetary gear set is a ring gear member.

11. The hybrid transmission of claim 1, wherein the input member is connected for common rotation with a first member of the first planetary gear set; wherein the first motor/generator is connected for common rotation with a second member of the first planetary gear set; wherein the third member of the first planetary gear set is selectively grounded to the stationary member by engagement of the first torque-transmitting mechanism and is continuously connected for common rotation with the first member of the second planetary gear set;

wherein the second motor/generator is continuously connected for common rotation with the third member of the second planetary gear set and with the second member of the third planetary gear set; wherein the output member is continuously connected for common rotation with the second member of the second planetary gear set; and wherein the second torque-transmitting mechanism is selectively engageable to connect the second member of the first planetary gear set for common rotation with the third member of the third planetary gear set.

12. The hybrid transmission of claim 11, wherein the first member of the first planetary gear set is a ring gear member, the second member of the first planetary gear set is a sun gear member, and the third member of the first planetary gear set is a carrier member; wherein the first member of the second planetary gear set is a ring gear member, the second member of the second planetary gear set is a carrier member, and the third member of the second planetary gear set is a sun gear member; and wherein the first member of the third planetary gear set is a carrier member, the second member of the third planetary gear set is a ring gear member, and the third member of the third planetary gear set is a sun gear member.

13. The hybrid transmission of claim 1, wherein one of the motor/generators is operable to start the engine when the first torque-transmitting mechanism is engaged and the second torque-transmitting mechanism is not engaged.

14. A hybrid transmission operatively connected with an engine, comprising:
an input member operatively connected with the engine;
an output member;
a first, a second, and a third planetary gear set, each of the planetary gear sets having a first, a second, and a third member; wherein the input member is connected for common rotation with one of the first member of the first planetary gear set and the first member of the third planetary gear set; wherein the output member is connected for common rotation with the other of the first member of the first planetary gear set and the first member of the third planetary gear set;
a first motor/generator operatively connected with the second member of the first planetary gear set;
a second motor/generator operatively connected with the second member of the third planetary gear set;
a first interconnecting member continuously connecting the third member of the first planetary gear set for common rotation with the first member of the second planetary gear set;
a second interconnecting member continuously connecting the second member of the second planetary gear set for common rotation with the first member of the third planetary gear set;
a third interconnecting member continuously connecting the third member of the second planetary gear set for common rotation with the second member of the third planetary gear set;
a first torque-transmitting mechanism selectively engageable to ground the first interconnecting member to a stationary member to establish a hybrid series operating mode between the input member and the output member;
a second torque-transmitting mechanism selectively engageable to connect the second member of the first planetary gear set for common rotation with the third member of the third planetary gear set to establish a compound-split operating mode between the input member and the output member; and
wherein a shift between the hybrid series operating mode and the compound-split operating mode is synchronous without slipping the torque-transmitting mechanisms.

15. The hybrid transmission of claim 14, wherein the first member of the first planetary gear set is a carrier member, the second member of the first planetary gear set is a sun gear member, and the third member of the first planetary gear set is a ring gear member; wherein the first member of the second planetary gear set is a carrier member, the second member of the second planetary gear set is a ring gear member, and the third member of the second planetary gear set is a sun gear member; and wherein the first member of the third planetary gear set is a carrier member, the second member of the third planetary gear set is a sun gear member, and the third member of the third planetary gear set is a ring gear member.

16. The hybrid transmission of claim 14, wherein the first member of the first planetary gear set is a carrier member, the second member of the first planetary gear set is a sun gear member, and the third member of the first planetary gear set is a ring gear member; wherein the first member of the second planetary gear set is a ring gear member, the second member of the second planetary gear set is a carrier member, and the third member of the second planetary gear set is a sun gear member; and wherein the first member of the third planetary gear set is a carrier member, the second member of the third planetary gear set is a sun gear member, and the third member of the third planetary gear set is a ring gear member.

17. The hybrid transmission of claim 14, wherein the first member of the first planetary gear set is a carrier member, the second member of the first planetary gear set is a sun gear member, and the third member of the first planetary gear set is a ring gear member; wherein the first member of the second planetary gear set is a carrier gear member, the second member of the second planetary gear set is a ring gear member, and the third member of the second planetary gear set is a sun gear member; and wherein the first member of the third planetary gear set is a carrier member, the second member of the third planetary gear set is a ring gear member, and the third member of the third planetary gear set is a sun gear member.

18. The hybrid transmission of claim 14, wherein the input member is connected for common rotation with a first member of the first planetary gear set; wherein the first motor/generator is connected for common rotation with a second member of the first planetary gear set; wherein the third member of the first planetary gear set is selectively grounded to the stationary member by engagement of the first torque-transmitting mechanism and is continuously connected for common rotation with the first member of the second planetary gear set;
wherein the second motor/generator is continuously connected for common rotation with the third member of the second planetary gear set and with the second member of the third planetary gear set; wherein the output member is continuously connected for common rotation with the second member of the second planetary gear set; and wherein the second torque-transmitting mechanism is selectively engageable to connect the second member of the first planetary gear set for common rotation with the third member of the third planetary gear set.

* * * * *